(12) United States Patent
Look et al.

(10) Patent No.: US 9,041,734 B2
(45) Date of Patent: May 26, 2015

(54) SIMULATING THREE-DIMENSIONAL FEATURES

(75) Inventors: Howard D. Look, Palo Alto, CA (US);
Leo B. Baldwin, Livermore, CA (US);
Kenneth M. Karakotsios, San Jose, CA (US); Dennis Hodge, Bellevue, WA (US); Isaac S. Noble, Soquel, CA (US);
Volodymyr V. Ivanchenko, Mountain View, CA (US); Jeffrey P. Bezos, Greater Seattle Area, WA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 43 days.

(21) Appl. No.: 13/209,243

(22) Filed: Aug. 12, 2011

(65) Prior Publication Data

US 2013/0016102 A1    Jan. 17, 2013

Related U.S. Application Data

(60) Provisional application No. 61/507,110, filed on Jul. 12, 2011.

(51) Int. Cl.
*G09G 5/00* (2006.01)
*G06T 15/20* (2011.01)
(Continued)

(52) U.S. Cl.
CPC ............ *G06T 15/20* (2013.01); *G06K 9/00604* (2013.01); *G06T 7/0042* (2013.01); *G06T 2207/10016* (2013.01); *G06T 2207/30201* (2013.01)

(58) Field of Classification Search
CPC .................... G09G 2340/10; G09G 2340/125; G06T 11/60; G06T 15/503

USPC ............ 345/428, 853, 851, 441, 629; 348/46, 348/190, 187, 51; 382/103, 190, 160, 224; 715/739, 744, 849
See application file for complete search history.

(56) References Cited

U.S. PATENT DOCUMENTS

| | | | |
|---|---|---|---|
| 5,563,988 A | 10/1996 | Maes et al. | |
| 5,616,078 A | 4/1997 | Oh | |

(Continued)

FOREIGN PATENT DOCUMENTS

| | | |
|---|---|---|
| CN | 1694045 A | 11/2005 |
| JP | 2002-164990 | 6/2002 |

(Continued)

OTHER PUBLICATIONS

Nokia N95 8GB Data Sheet, Nokia, 2007, 1 page.
(Continued)

*Primary Examiner* — Abderrahim Merouan
(74) *Attorney, Agent, or Firm* — Novak Druce Connolly Bove + Quigg LLP

(57) ABSTRACT

Image information displayed on an electronic device can be modified based at least in part upon a relative position of a user with respect to a device. Mapping, topological or other types of positional data can be used to render image content from a perspective that is consistent with a viewing angle for the current relative position of the user. As that viewing angle changes, as a result of movement of the user and/or the device, the content can be re-rendered or otherwise updated to display the image content from a perspective that reflects the change in viewing angle. Simulations of effects such as parallax and occlusions can be used with the change in perspective to provide a consistent user experience that provides a sense of three-dimensional content even when that content is rendered on a two-dimensional display. Lighting, shading and/or other effects can be used to enhance the experience.

25 Claims, 13 Drawing Sheets

(51) Int. Cl.
*G06K 9/00* (2006.01)
*G06T 7/00* (2006.01)

(56) References Cited

U.S. PATENT DOCUMENTS

| | | | |
|---|---|---|---|
| 5,850,211 A | 12/1998 | Tognazzini | |
| 6,272,231 B1 | 8/2001 | Maurer et al. | |
| 6,385,331 B2 | 5/2002 | Harakawa et al. | |
| 6,392,667 B1* | 5/2002 | McKinnon et al. | 715/738 |
| 6,434,255 B1 | 8/2002 | Harakawa | |
| 6,750,848 B1 | 6/2004 | Pryor | |
| 6,863,609 B2 | 3/2005 | Okuda et al. | |
| 6,956,566 B2 | 10/2005 | Gelb | |
| 6,959,102 B2 | 10/2005 | Peck | |
| 7,033,025 B2* | 4/2006 | Winterbotham | 351/203 |
| 7,104,891 B2* | 9/2006 | Osako et al. | 463/32 |
| 7,199,767 B2 | 4/2007 | Spero | |
| 7,301,526 B2 | 11/2007 | Marvit et al. | |
| 7,379,566 B2 | 5/2008 | Hildreth | |
| 7,401,783 B2 | 7/2008 | Pryor | |
| 7,519,223 B2 | 4/2009 | Dehlin et al. | |
| 8,238,026 B1 | 8/2012 | Kemme et al. | |
| 2002/0071277 A1 | 6/2002 | Starner et al. | |
| 2002/0167669 A1 | 11/2002 | Schwarz | |
| 2002/0180799 A1 | 12/2002 | Peck et al. | |
| 2003/0142068 A1 | 7/2003 | DeLuca | |
| 2004/0032409 A1* | 2/2004 | Girard | 345/426 |
| 2004/0140956 A1 | 7/2004 | Kushler et al. | |
| 2004/0230904 A1 | 11/2004 | Tada | |
| 2005/0133693 A1 | 6/2005 | Fouquet et al. | |
| 2005/0248529 A1 | 11/2005 | Endoh | |
| 2006/0017692 A1* | 1/2006 | Wehrenberg et al. | 345/156 |
| 2006/0020898 A1* | 1/2006 | Kim et al. | 715/764 |
| 2006/0038881 A1* | 2/2006 | Starkweather et al. | 348/51 |
| 2007/0164989 A1 | 7/2007 | Rochford et al. | |
| 2007/0236485 A1* | 10/2007 | Trepte | 345/207 |
| 2008/0005418 A1 | 1/2008 | Julian | |
| 2008/0013826 A1 | 1/2008 | Hillis et al. | |
| 2008/0019589 A1 | 1/2008 | Yoon | |
| 2008/0040692 A1 | 2/2008 | Sunday et al. | |
| 2008/0069438 A1* | 3/2008 | Winn et al. | 382/160 |
| 2008/0122803 A1 | 5/2008 | Izadi et al. | |
| 2008/0136916 A1 | 6/2008 | Wolff | |
| 2008/0140481 A1* | 6/2008 | Gold | 705/7 |
| 2008/0158096 A1 | 7/2008 | Breed | |
| 2008/0174570 A1 | 7/2008 | Jobs et al. | |
| 2008/0211813 A1* | 9/2008 | Jamwal et al. | 345/426 |
| 2008/0266289 A1* | 10/2008 | Park | 345/419 |
| 2008/0266530 A1 | 10/2008 | Takahashi et al. | |
| 2008/0276196 A1 | 11/2008 | Tang | |
| 2009/0031240 A1 | 1/2009 | Hildreth | |
| 2009/0058845 A1 | 3/2009 | Fukuda et al. | |
| 2009/0079813 A1 | 3/2009 | Hildreth | |
| 2009/0184981 A1* | 7/2009 | de Matos | 345/676 |
| 2009/0196460 A1 | 8/2009 | Jakobs et al. | |
| 2009/0213120 A1 | 8/2009 | Nisper et al. | |
| 2009/0265627 A1 | 10/2009 | Kim et al. | |
| 2009/0296989 A1* | 12/2009 | Ramesh et al. | 382/103 |
| 2009/0313584 A1* | 12/2009 | Kerr et al. | 715/849 |
| 2010/0023878 A1* | 1/2010 | Douris et al. | 715/757 |
| 2010/0066676 A1 | 3/2010 | Kramer et al. | |
| 2010/0079426 A1* | 4/2010 | Pance et al. | 345/207 |
| 2010/0097332 A1 | 4/2010 | Arthur et al. | |
| 2010/0103172 A1* | 4/2010 | Purdy, Sr. | 345/426 |
| 2010/0125816 A1* | 5/2010 | Bezos | 715/863 |
| 2010/0225743 A1* | 9/2010 | Florencio et al. | 348/46 |
| 2010/0283998 A1 | 11/2010 | Souchkov et al. | |
| 2011/0006978 A1 | 1/2011 | Yuan | |
| 2011/0063295 A1 | 3/2011 | Kuo et al. | |
| 2011/0128223 A1 | 6/2011 | Lashina et al. | |
| 2011/0145718 A1* | 6/2011 | Ketola et al. | 715/739 |
| 2011/0221667 A1* | 9/2011 | Lee | 345/156 |
| 2011/0243388 A1* | 10/2011 | Sakaguchi et al. | 382/103 |
| 2011/0292078 A1 | 12/2011 | Lapstun et al. | |
| 2012/0206333 A1 | 8/2012 | Kim | |

FOREIGN PATENT DOCUMENTS

| | | |
|---|---|---|
| JP | 2002-351603 | 12/2002 |
| JP | 2004-318826 | 11/2004 |
| JP | 2007-121489 | 5/2007 |
| JP | 2008-97220 | 4/2008 |
| WO | 02/15560 A3 | 2/2002 |
| WO | 2006/036069 A1 | 4/2006 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Faceshift Documentation: Faceshift Studio Beta", http://www.faceshift.com/help/studio/beta/, 2012, 12 pages.

"Final Office Action dated Oct. 23, 2013", U.S. Appl. No. 12/786,297, 15 pages.

"Final Office Action dated Oct. 27, 2011", U.S. Appl. No. 12/332,049, 66 pages.

"Final Office Action dated Jun. 3, 2013", U.S. Appl. No. 13/083,303, 17 pages.

"Final Office Action dated Jun. 6, 2013", U.S. Appl. No. 12/332,049, 70 pages.

"First Office Action dated Mar. 22, 2013", China Application 200980146841.0, 39 pages.

"International Preliminary Examination Report on Patentability dated Oct. 17, 2013", International Application PCT/US2012/032148, 5 pages.

"International Search Report dated Oct. 2, 2012", International Application No. PCT/US12/46518, Oct. 2, 2012, 7 pages.

"International Search Report dated Apr. 7, 2010", International Application PCT/US09/65364, 2 pages.

"International Search Report dated Jul. 26, 2012", International Application PCT/US2012/032148, 7 pages.

"International Written Opinion dated Apr. 7, 2010", International Application PCT/US09/65364, 7 pages.

"Introducing the Wii MotionPlus, Nintendo's Upcoming Accessory for the Revolutionary Wii Remote at Nintendo:: What's New", Nintendo Games, http://www.nintendo.com/whatsnew/detail/eM-MuRj__N6vntHPDycCJAKWhE09zBvyPH, Jul. 14, 2008, 2 pages.

"Non Final Office Action dated Nov. 7, 2012", U.S. Appl. No. 12/332,049, 64 pages.

"Non Final Office Action dated Nov. 7, 2013", U.S. Appl. No. 13/246,561, 18 pages.

"Non Final Office Action dated Dec. 21, 2012", Korea Application 10-2011-7013875, 4 pages.

"Non Final Office Action dated Dec. 6, 2012", U.S. Appl. No. 13/083,303, 16 pages.

"Non Final Office Action dated Mar. 28, 2013", U.S. Appl. No. 12/786,297, 15 pages.

"Non Final Office Action dated Apr. 2, 2013", Japan Application 2011-537661, 2 pages.

"Non Final Office Action dated Jun. 10, 2011", U.S. Appl. No. 12/332,049, 48 pages.

"Notice of Allowance dated Oct. 2, 2013", U.S. Appl. No. 13/076,322, 11 pages.

"Notice of Allowance dated Aug. 14, 2013", U.S. Appl. No. 13/083,303, 6 pages.

"Office Action dated May 13, 2013", Canada Application 2,743,914, 2 pages.

Brashear, Helene et al., "Using Multiple Sensors for Mobile Sign Language Recognition", International Symposium on Wearable Computers, 2003, 8 pages.

Cappelletta, Luca et al., "Phoneme-to-Viseme Mapping for Visual Speech Recognition", Department of Electronic and Electrical Engineering, Trinity College Dublin, Ireland, 2012, 8 pages.

Cornell, Jay, "Does This Headline Know You're Reading It?", h+ Magazine, located at <http://hplusmagazine.com/articles/ai/does-headline-know-you%E2%80%99re-reading-it>, last accessed on Jun. 7, 2010, Mar. 19, 2010, 4 pages.

(56) References Cited

OTHER PUBLICATIONS

Haro, Antonio et al., "Mobile Camera-Based Adaptive Viewing", MUM '05 Proceedings of the 4th International Conference on Mobile and Ubiquitous Mulitmedia., 2005, 6 pages.

Padilla, Raymond, "Eye Toy (PS2)", <http://www.archive.gamespy.com/hardware/august03/eyetoyps2/index.shtml, Aug. 16, 2003, 2 pages.

Schneider, Jason, "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.

Tyser, Peter, "Control an iPod with Gestures", http://www.videsignline.com/howto/170702555, Sep. 11, 2005, 4 pages.

Van Den Berg, Thomas T., "Near Infrared Light Absorption in the Human Eye Media", Vision Res., vol. 37, No. 2, 1997, pp. 249-253.

Zyga, Lisa, "Hacking the Wii Remote for Physics Class", PHYSorg.com, http://www.physorg.com/news104502773.html, Jul. 24, 2007, 2 pages.

"Non-Final Office Action dated Jan. 21, 2014," U.S. Appl. No. 13/107,749, 27 pages.

"Final Office Action dated Jun. 17, 2014," U.S. Appl. No. 13/107,749, 30 pages.

"Notice of Allowance dated Jul. 8, 2014," U.S. Appl. No. 12/786,297, 6 pages.

* cited by examiner

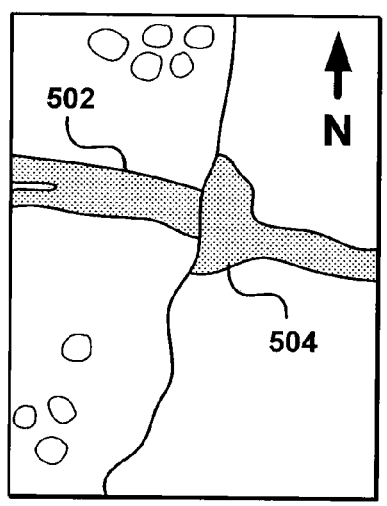
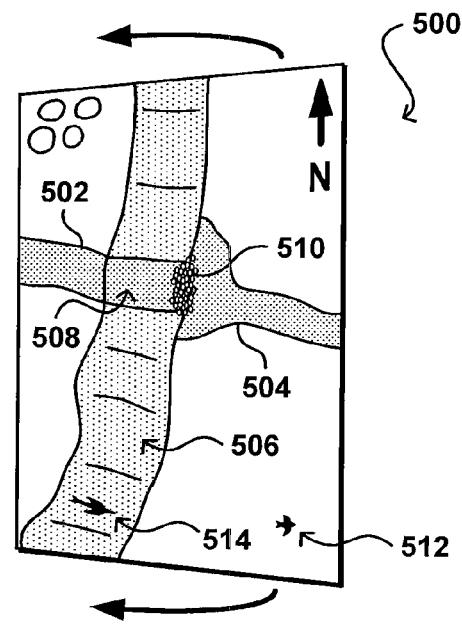
FIG. 5(a)  FIG. 5(b)
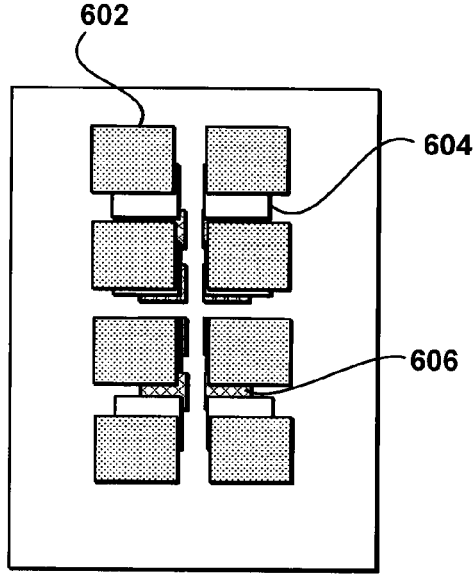
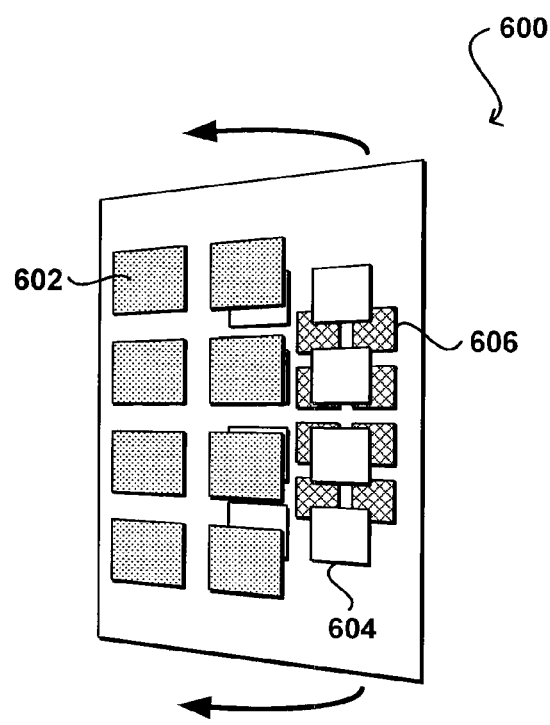
FIG. 6(a)  FIG. 6(b)

1

SIMULATING THREE-DIMENSIONAL FEATURES

RELATED APPLICATIONS

This application claims priority to U.S. Provisional Patent Application No. 61/507,110, filed on Jul. 12, 2011, the content of which is incorporated herein by reference in its entirety.

BACKGROUND

As the capabilities of various computing devices increase, and as people are utilizing computing devices for an increasing variety of tasks, there are additional challenges being faced in meeting user expectations. For example, an increasing number of applications are providing virtual or enhanced reality experiences, which at least attempt to provide the user with some level of three-dimensional experience. While some devices utilize three-dimensional displays that require specific hardware, such as special viewing glasses, a large number of devices utilize conventional two-dimensional displays or provide content that is substantially created in two dimensions. While certain shading or rendering can be utilized to give the impression of three-dimensional content, the content will typically not act like a true three-dimensional object or scene, as changes in position, orientation or lighting will generally not be updated realistically in the display. Thus, the virtual nature of the displayed content can be significantly degraded.

BRIEF DESCRIPTION OF THE DRAWINGS

Various embodiments in accordance with the present disclosure will be described with reference to the drawings, in which:

FIGS. 5(a)-5(b) illustrate example displays of the topographical information for different orientations in accordance with various embodiments;

FIGS. 6(a)-6(b) illustrate example displays of levels of graphical icons that can move by level in accordance with various embodiments;

DETAILED DESCRIPTION

Figure 1:
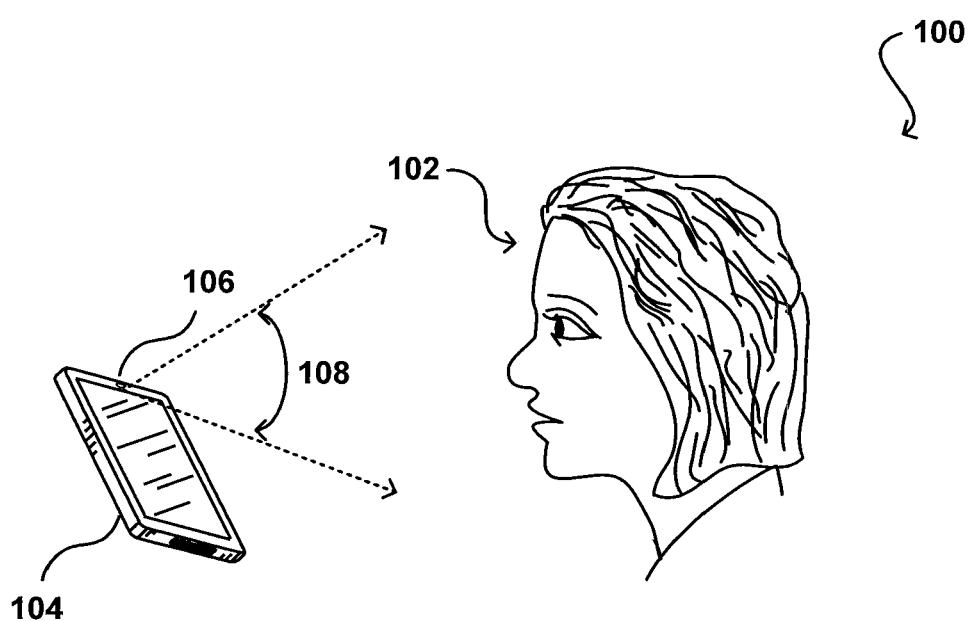
FIG. 1 illustrates an environment in which a user is able to interact with an electronic device in accordance with various embodiments.

Systems and methods in accordance with various embodiments of the present disclosure may overcome one or more of the aforementioned and other deficiencies experienced in conventional approaches to displaying content on an electronic device. In particular, various embodiments enable adjustments to be made to displayed image content (e.g., still or video content) based at least in part upon a current relative position or orientation of a user with respect to the device, as well as changes in that relative position or orientation. The adjustments can include, for example, changes due to parallax or occlusion, which when added to the rendered content in response to relative movement between a user and a device can enhance the experience of the user and increase realism for content rendered on a two- or three-dimensional display element. For example, if a user is viewing a graphical representation of a street map that includes a three-dimensional representation of a push-pin, portions of the map may be blocked, or occluded, from view based on the user's viewpoint. In various embodiments described herein, a user can alter their viewpoint (e.g., by moving the device or their self with respect to the device) and see the previously occluded section of the map as if they are looking around the push-pin.

In various embodiments, the relative position of a user with respect to a device can be determined using at least one image capture element of an electronic device. This position is referred to herein as the viewpoint of the user. For example, the feed from a video camera can be analyzed to locate a relative position of a user in the video feed, which can be analyzed to determine the relative viewpoint of the user. In other embodiments, one or more digital still cameras can periodically capture images to be analyzed for user position, as distance can often be determined in addition to direction when analyzing multiple sources of information from different locations. In still other embodiments, infrared (IR) imaging can be used to detect features of a user, such as the user's head or eyes, for use in determining and/or tracking the location of the user.

Based at least in part upon the determined relative viewpoint of the user, an electronic device can determine a primary viewing angle with respect to content (e.g., a scene) to be rendered and displayed on the device. For at least certain types of content, the device can adjust the rendering to provide a two- or three-dimensional representation of that content that is appropriate for that viewpoint, giving the impression of a three-dimensional view or display even when the display is in two dimensions.

In at least some embodiments, an electronic device determines changes in the relative viewpoint, position, direction and/or orientation between the user and device in order to update the perspective from which the displayed content is rendered. For example, the device can continue capturing and analyzing image information to determine changes in the relative viewpoint of the user with respect to the device. Such change may be based on movement of the user and/or the device. The device also can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the user and the device might not have substantially changed. The display can be updated based at least in part upon changes in orientation as well. By adjusting the perspective from which the image content is rendered to correspond to changes in the relative viewpoint of the user, a three-dimensional representation can be generated on a two- or three-dimensional display element that is consistent, across multiple viewing angles, with actual or virtual three-dimensional content.

The ability to update a perspective of rendered content can provide additional advantages as well. For example, an object might at least partially obscure or occlude another object in the displayed image. Using conventional displays, a user would not be able to view the occluded content. By enabling the rendering perspective to change based upon relative viewpoint of the user, a user can effectively look "around" the occlusion to view the content that was previously not visible in the display simply by modifying their position relative to the device, modifying the position of the device itself or any combination of the two. Further, the amount by which the occlusion is altered based upon a change in viewpoint of the user can be indicative of a relative height or distance between the occlusion and the other content, which can be useful for mapping or other such applications.

In order to further enhance the feeling of a virtual, three-dimensional environment, various other aspects of the display can be adjusted as well. For example, objects in the display can have a three-dimensional model or data associated therewith, such that the objects can be rotated to show views consistent with changes in perspective. A building on a map might show a top-down view by default, and a user might be able to see the sides of the building by rotating the device or moving the user's head position. Similarly, shadows and shading can be adjusted to be appropriate for the perspective. For a building in the sun, for example, the sides of the building that are in the shade can be consistent with the sun position regardless of the orientation of the device. In other embodiments, image content might be lighted or shaded according to one or more light sources near the device, and the lighting direction can be updated in response to movement of the device to shade the objects in the image according to the position of the light source.

In some embodiments, the device might have elements that are capable of moving or rotating to provide directionality. For example, an image capture element might include components such as a moving camera, adjustable mirror or lens, rotating gimbal or other such element to increase the field of view and/or enable image data to be captured from a specific direction and/or distance. Any data input or output can be adjusted based upon a current relative position of a user.

Various other applications, processes and uses are presented below with respect to the various embodiments.

FIG. 1 illustrates an example situation 100 wherein a user 102 is viewing content displayed on a display element of an electronic device 104. The device 104 in this example has at least one imaging element 106 positioned on a side or corner of the device such that the imaging element will likely be able to capture image information of at least a portion of the user 102 while the user is viewing content displayed on the device. For example, the imaging element 106 in FIG. 1 is located on the front of the device such that an angular capture range 108 of the imaging element can image at least a portion of the user while the user is viewing content displayed on the display element of the electronic device 104. As will be discussed in detail later herein, being able to capture image information for the user enables the electronic device to determine a relative position and/or orientation of the user with respect to the electronic device and adjust a display of content on the device in accordance with that position and/or orientation. Using that information, a three-dimensional model can be used to generate viewing-angle appropriate images based on the viewpoint of the user.

Figure 2A:
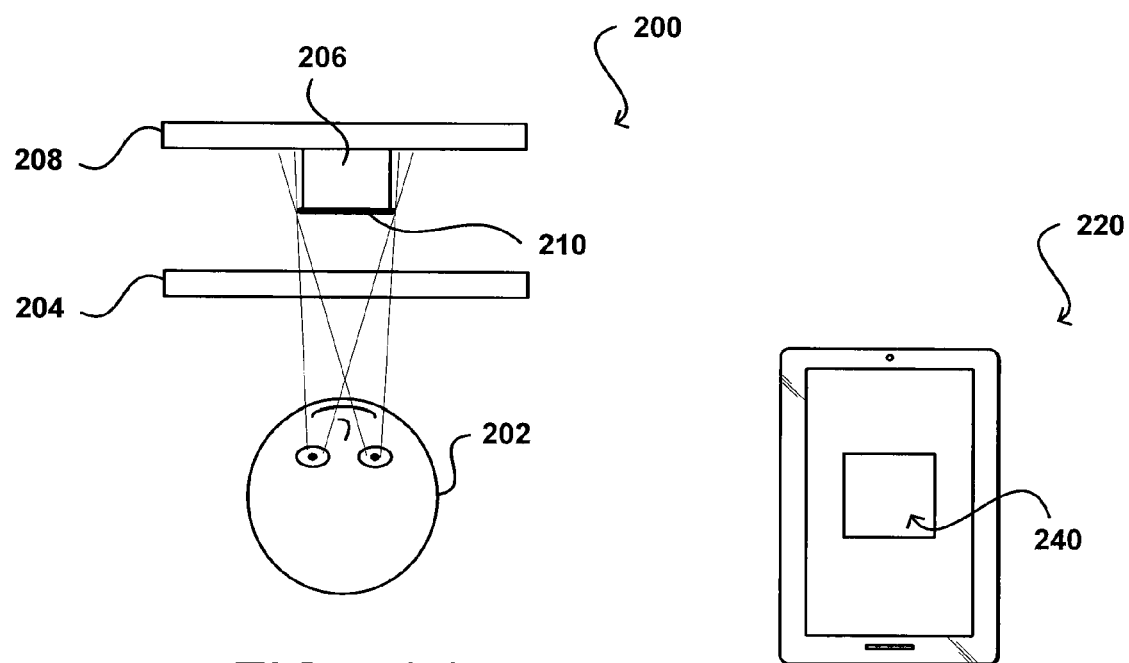
FIGS. 2(a)-2(b) illustrate example approaches to determining changes in the relative viewing angle for a user in accordance with various embodiments.
Figure 2B:
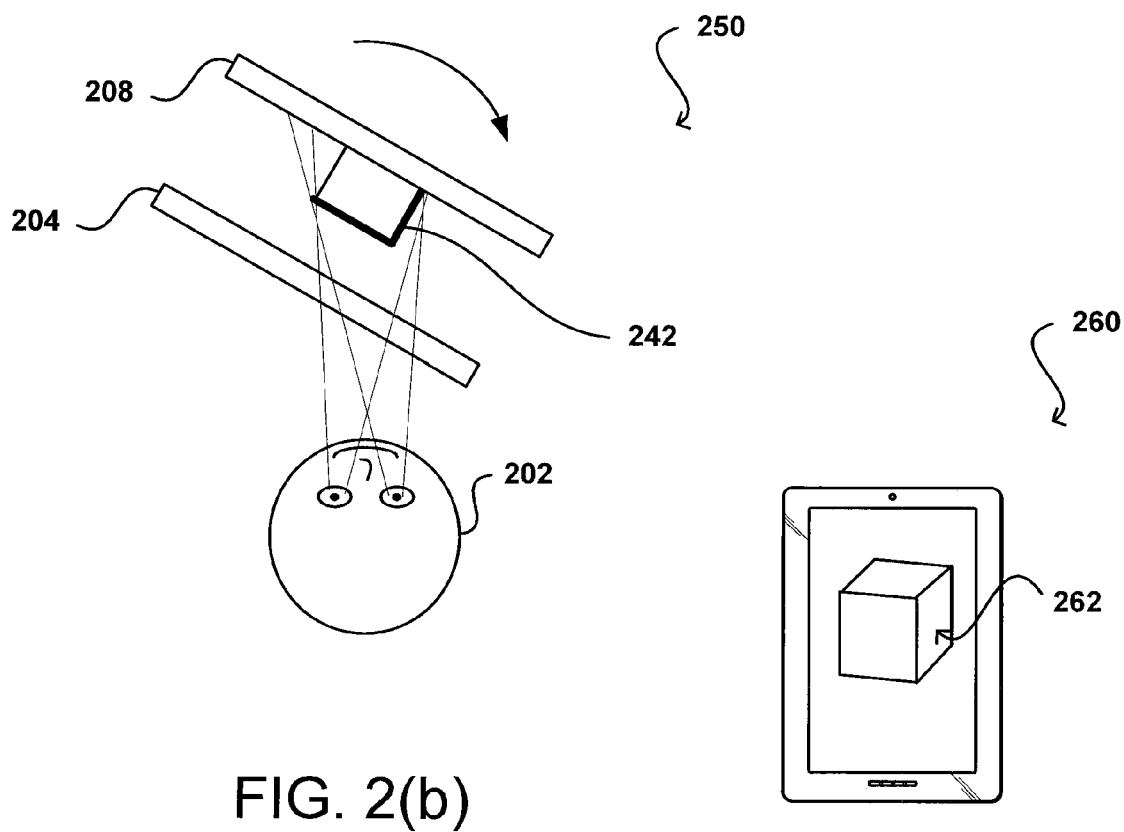

FIGS. 2(a) to 2(b) illustrate an example of how a three-dimensional model can be used to generate viewing-angle appropriate images in accordance with at least some embodiments. In FIG. 2(a), the example orientation 200 has a user 202 substantially in front of a display element 204 of a device. For simplicity of explanation and as shown in FIG. 2(a), the model here is represented in three dimensions, with a box 206 on a background 208. At the current viewing angle, the user is only able to see a surface 210 of the box 206, as illustrated by viewable portion 240 in display view 220. In the orientation 250 of FIG. 2(b), the device has been rotated (or the user has moved with respect to the device). To provide an appropriate user experience in at least some embodiments, the graphical representation model is effectively rotated with the device, such that the user is able to see a top surface and two sides of box 206 and background 208 would rotate accordingly. Based on the current viewpoint of the user 202, it can be seen in the display view 260 of FIG. 2(b) that the viewable surfaces 242 of the box include not only the top of the box but at least one side of the box as well, as illustrated by viewable portion 262. By calculating this viewing angle, the application can determine the portions of the top and side of the box to display as a result of the rotation. It also can be seen in FIG. 2(b) that any area occluded by the right side of the box in FIG. 2(a) now can be seen, and that the area occluded by the left side of the box is now greater in FIG. 2(b).

Figure 3:
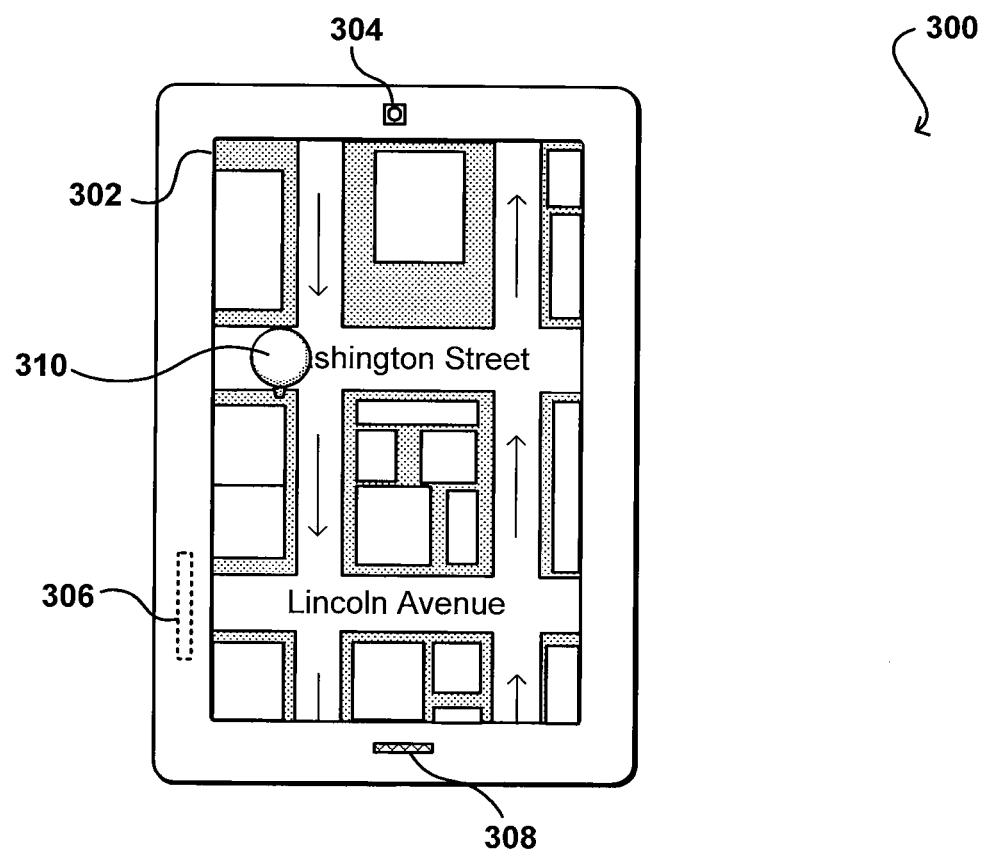
FIG. 3 illustrates an example display of map information including a location pin that can be generated in accordance with various embodiments.

To further illustrate, FIG. 3 depicts an example device 300 displaying map content on a display element 302 of the device. Although a portable computing device (e.g., a smart phone, an electronic book reader or tablet computer) is shown, it should be understood that any device capable of receiving, processing and displaying information can be used in accordance with various embodiments discussed herein. These devices can include, for example, desktop computers, notebook computers, electronic book readers, personal data assistants, cellular phones, video gaming consoles or controllers, television set top boxes and portable media players, among others. In this example, the user has entered an address into a mapping application, and mapping information is generated for display on the display element 302, including a pin or marker 310 indicating the approximate location of the address on the map region. Approaches to locating an address or location and generating map information are well known in the art and, as such, will not be discussed herein in detail.

As discussed, it can be desirable in at least certain embodiments to enhance the realism of such a situation as much as possible. One way is to add shading to the image such that the pin and buildings displayed appear to be three-dimensional objects. In existing systems, the shadows are rendered based on a virtual light source emitting light from a fixed direction and applied to a particular view, such as a top-down view as illustrated. If the user moves the device, or moves relative to the device, however, the shading will not change and the perspective of the device will not adjust to show buildings or the pin from appropriate views resulting from the rotation, which can take the user out of the experience. Similarly, the appearance of the items will not adjust if the user's viewpoint changes relative to the device, such that the user will be aware that the display is a two-dimensional rendering.

Systems and methods in accordance with various embodiments can take advantage of any of a number of elements that can be used to determine changes in relative position and/or orientation between a user and an electronic device as well as determine the user's viewpoint with respect to the device. For example, the device 300 in FIG. 3 includes an imaging element 304 which can be used to capture image information for determining a relative viewpoint of a user with respect to the device, as mentioned above. An orientation-determining element 306, such as an accelerometer, electronic gyroscope or inertial sensor, can determine changes in the position or orientation of the device. Other input elements 308, such as microphones or proximity sensors, can be used as well in other embodiments. The information from at least some of these elements can be analyzed to determine a current viewpoint from the perspective of the user. By determining the user's current viewpoint, for example, the device can render content that corresponds substantially to a three-dimensional view of the content from the perspective of the user.

Figure 4A:
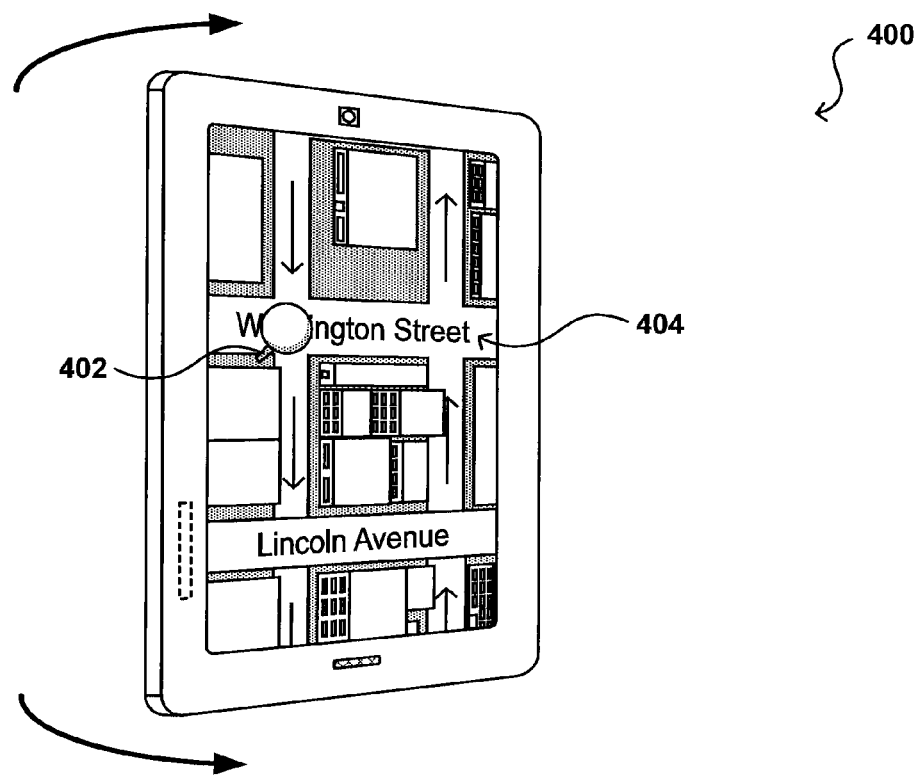
FIGS. 4(a)-4(b) illustrate example displays of the map information and pin of FIG. 3 in response to different movements in accordance with various embodiments.

For example, FIG. 4(a) illustrates an example orientation of the device 400 upon the device being rotated along a primary axis of the device, although a similar change in relative viewpoint could result from motion of the user as will be discussed in more detail later herein. As can be seen, the rotation of the device triggered a corresponding change in the map information 404 displayed on the device. For example, instead of seeing only a top view of each building (FIG. 3), the sides of various buildings are displayed corresponding to the current viewpoint of the user. Thus, even though the display is a two-dimensional display, the rendered view of a building can be such that the display will present a view of that building that is similar to what the user would see if viewing a three-dimensional version of a building from their current viewpoint. In this example, where the left edge of the device is rotated toward the user (out of the plane of FIG. 4(a)), the left sides of various buildings are rendered (along with a portion of the roof or other perspective-appropriate portions) based on the user direction being substantially orthogonal to the plane of FIG. 4(a).

In FIG. 4(a), the rendering of the location pin 402 has also updated accordingly. In FIG. 3, the pin was shown in a substantially top-down view. In FIG. 4(a), the location pin 402 is rendered in a perspective view based upon the current relative viewpoint of the user with respect to the device. In addition to changing the way the pin is displayed, the user can now view information that might have previously been hidden or occluded by the pin in the top view. For example, in FIG. 3 the "W" in "Washington Street" was occluded by the location of the pin. In FIG. 4(a), the rotation of the device has resulted in the rendering of the pin changing to reflect the user's current viewpoint, which results in the "W" in "Washington Street" now being viewable by the user. Thus, the rendering changes not only the perspective of various elements but can also render those elements appropriately relative to any other elements or occluded portions in order to further provide the sense of a three-dimensional world. A user thus can adjust the relative orientation between the user and the device to view information occluded by an object, which may not have been possible in conventional approaches without manually moving or removing the pin rendered in the display.

Since the user was not able to see the full name of "Washington Street" in either of the previous orientations (FIGS. 3 and 4(a)), the user can continue to adjust the relative orientation of the device until the desired information is viewable. For example, in FIG. 4(b) the user can tilt the top of the screen toward the user (top of the device is rotated out of the plane of FIG. 4(b)), causing a different rendering of objects in the image. In this example, the sides of the buildings towards the top of the device can be seen, and a different rendering of the pin 402 is displayed based upon the new orientation. In this example, the name of the street that was previously occluded can now be seen in the displayed image information, as "Washington Street" is now visible in the image.

Figure 4B:
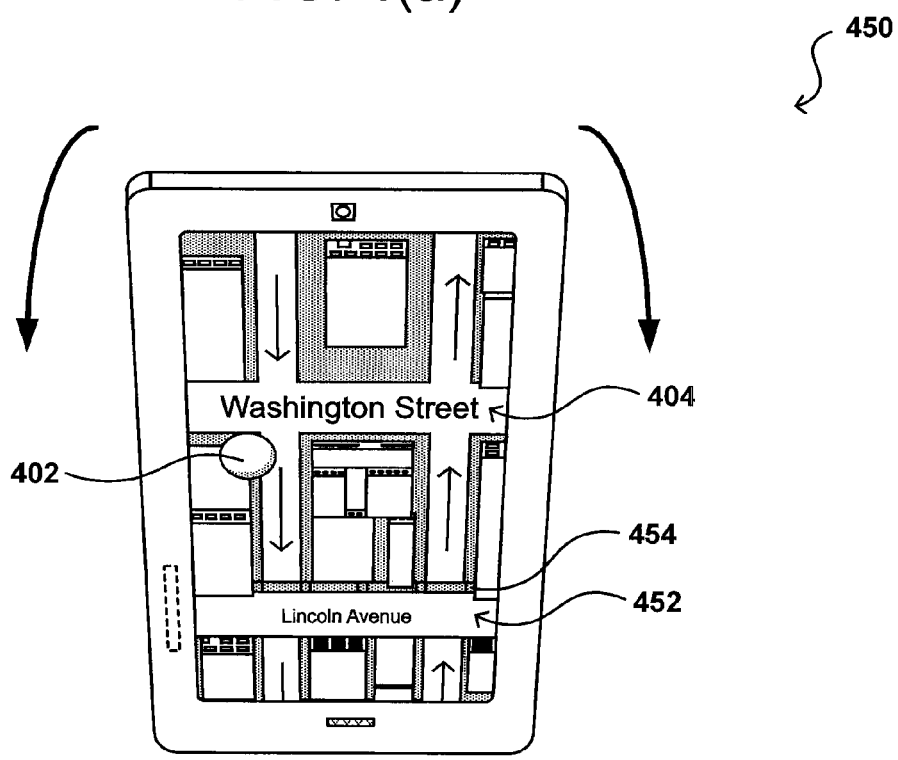

Another advantage of changing the orientation of the device is that the user can also view different angles of occlusions that might not otherwise have been obvious to the user. For example, in FIGS. 3 and 4(a) there is not much distinction in the display of "Washington Street" and "Lincoln Avenue," other than their respective locations. In the rendering of FIG. 4(b), however, the orientation illustrates that "Lincoln Avenue" is in fact a raised street 452, as the position of the street shifts upon orientation change due to the street being at a different distance or plane. Further, shadowing 454 or other elements (e.g., posts or arches) can be added to further illustrate the difference in location and perspective. Using conventional top-down views, the user might not have been able to discern that Lincoln Avenue was actually above the other nearby streets, and could not be turned directly onto from either of the one way streets that cross under Lincoln Avenue.

The ability to obtain information in three dimensions can be beneficial in other situations as well. For example, FIG. 5(a) illustrates an example of a display of topographical information 500 that could be viewed by a hiker, for example, using a portable global positioning device (GPS). In the top view of FIG. 5(a), the hiker can determine that there is a creek 502 flowing into a small pond 504. Based on the top view, the hiker might be able to determine that there is a drop-off from the creek to the pond, but not be able to determine the extent of the drop-off To obtain a better view, the hiker can rotate the device (or move the hiker's head) to obtain a perspective view of the area, such as that illustrated in FIG. 5(b). In this view, the side of the hill 506 can be seen as well as the amount of drop of the waterfall 508 from the creek 502 into the pool below 504. Such a viewing capability enables a hiker to be able to determine the terrain before hiking in a given direction, such as where the drop-off would be too great to climb/descend; helping the hiker to identify another place where there is a path or other way down to the pool 504.

In some embodiments, animations or other elements can be added to the display to enhance the effect of the virtual world, or three-dimensional view. These elements also can provide a variety of useful information. For example, the water in the creek can be animated and in some embodiments can be rendered to travel in the direction of flow of the actual creek in order to assist the hiker with finding his or her bearings, as well as determining the proper direction to a location of interest (i.e., the waterfall). Other elements can be added as well, such as an area of turbulence 510 where the waterfall 508 enters the pool 504, which can help to further emphasize the nature of the feature being displayed, as well as to enhance the virtual experience of the display.

Similarly, other graphical elements can be added that can both enhance the virtual nature of the display, as well as to provide useful information to a user. For example, elements such as shadows of clouds, birds or airplanes can be added that can move across the displayed region. In addition to enhancing the virtual world nature of the display, the shadows can be manipulated according to the type of terrain or the topography over which the shadow is moving. For example, consider the shadow of a first bird 512 in FIG. 5(*b*). Since the bird is flying over a relatively flat area, the shadow is substantially unaltered from a default shape. A shadow of a second bird 514 will be distorted as the shadow moves across the drop-off 506, representing the fact that the drop-off is at a relatively steep angle. The amount of the shadow distortion can be indicative of the slope and/or grade of the drop-off, which can be useful to a user attempting to determine the size of a feature in the display. Various other types of animation or movement can be used as well within the scope of various embodiments.

In a map or other topographic display such as that illustrated in FIGS. 4 and 5, information for the heights and/or elevation of various features and/or points can be determined using any appropriate mapping or modeling approach, which will not be discussed herein in detail as many conventional approaches can provide such topographic data. Applications executing on a computing device can utilize this topographic data, along with any of a number of types of image of various locations (e.g., street level or aerial views) to render the map images using any of a number of rendering approaches used for purposes such as rendering a two- or three-dimensional view of a three-dimensional model from a particular point of view. In some cases, however, there will not be detailed three-dimensional model data available for such purposes. Further, some approaches will prefer not to engage in a process such as three-dimensional modeling, as such approaches can be particularly processor intensive, which can be undesirable for small portable devices and other low capacity systems.

An approach in accordance with various embodiments can instead utilize layers of graphical elements that can move at different rates with respect to each other, providing a sense of depth and three-dimensional movement. For example, FIG. 6(*a*) illustrates a display 600 including three layers of graphical elements 602, 604, 606, such as graphical icons representing applications, folders, shortcuts, or any other type of object known or used on electronic devices to access various types of functionality or information. In this example, a first layer of elements 602 is rendered "over" a second layer of elements 604, which is rendered over a third layer of elements 606. It should be understood that there can be any number of levels including any appropriate number of elements, and that the ordering of the various layers can be adjusted or selected using any of a number of potential approaches, such as sorting or navigating the various layers. In this example, the elements of each layer are rendered with a different relative size, providing to the user a sense of distance of the various elements. In order to enhance that sense of distance, as well as to provide a sense of space and enable the user to obtain different views of the various elements, the layers can also move laterally with respect to each other at different rates, where the rate of movement is coupled with the relative size for that layer. For example, in FIG. 6(*b*) there has been relative movement between the user and the device on which the image information is displayed. As can be seen, the first layer of elements 602 that is "closest" to the user has moved on the display by the greatest amount. The second layer of elements 604 has moved on the display by a smaller amount, representative of their respective distances, with the third layer of elements 606 moving the least on the display, if at all. In fact, in embodiments where it is desired to keep the information substantially centered on the display, the third layer of elements might actually move on the display in the opposite direction, as illustrated in FIG. 6(*b*), although the net relative movement could remain the same in either approach. As can be seen, in addition to providing a sense of three-dimensional space, the ability to rotate the view enables different elements to be seen, which can help the user to locate and/or navigate to an element of interest, which might otherwise be hidden or occluded by an overlying element. For map views, for example, each block of buildings might be assigned to a different layer, enabling the user to make distance determinations and more accurately determine location information from the quasi-three-dimensional view.

In some embodiments, the graphical elements in FIG. 6(*b*) can be three-dimensional blocks that can be rotated individually as well, in order to show at least a side portion as discussed elsewhere herein. In this example, however, the elements are essentially "flat" or otherwise unable to rotate individually, with the three-dimensional feel being generated primarily by the differences in lateral translation. While the inability of the individual elements to rotate can potentially lessen the three-dimensional experience for some users with respect to rotatable elements, the amount of processing capacity can be significantly less and the rendering time less for at least some devices, which can enhance the overall user experience.

As discussed above with respect to FIG. 4(*b*), shading can be added to the display to enhance the user experience and/or provide additional information regarding the shape or relative location of various objects. In some embodiments, a device can assign a primary direction of a light source and light at least a portion of the rendered objects from that light direction. In some embodiments, a device can utilize information such as a present location, direction and/or time of day to determine a relative position of the sun, and can utilize that relative location as the primary light source for purposes of illumination and/or shading content rendered in the display. If available, a device can also access weather condition information to determine whether to render the screen under full or partial sun, for cloudy weather, rain, etc.

Figure 7A:
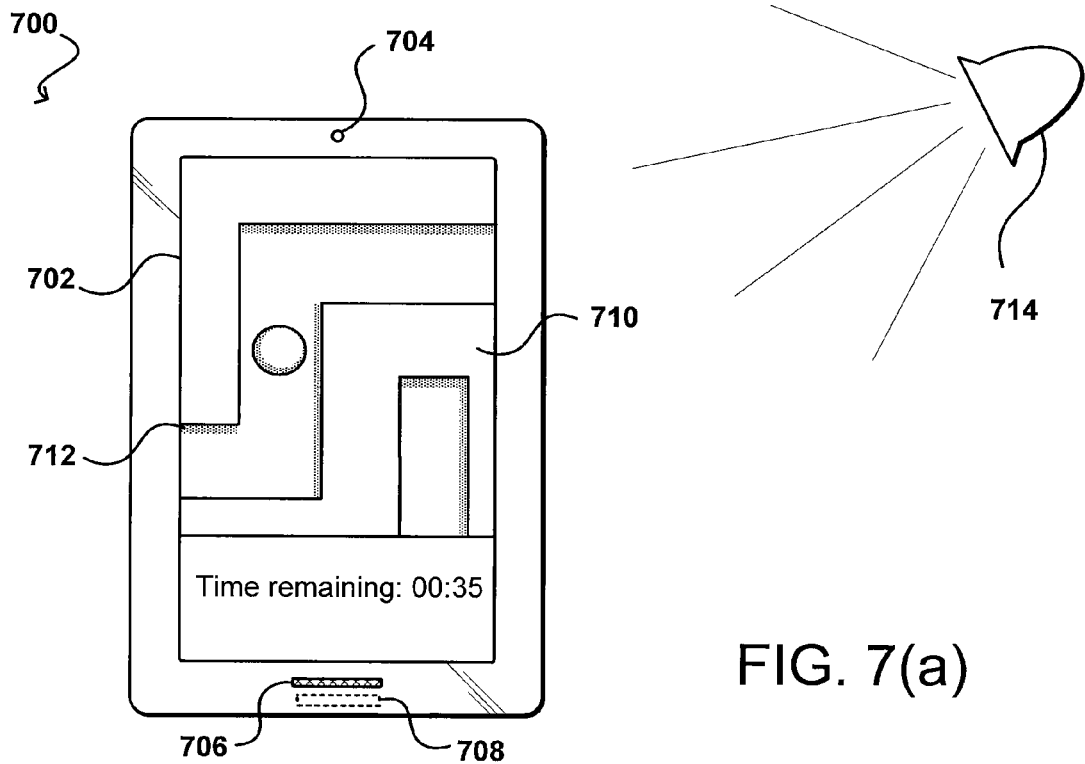
FIGS. 7(a)-7(b) illustrate example displays that include shading based on a local light source for different orientations of a device in accordance with various embodiments.
Figure 7B:
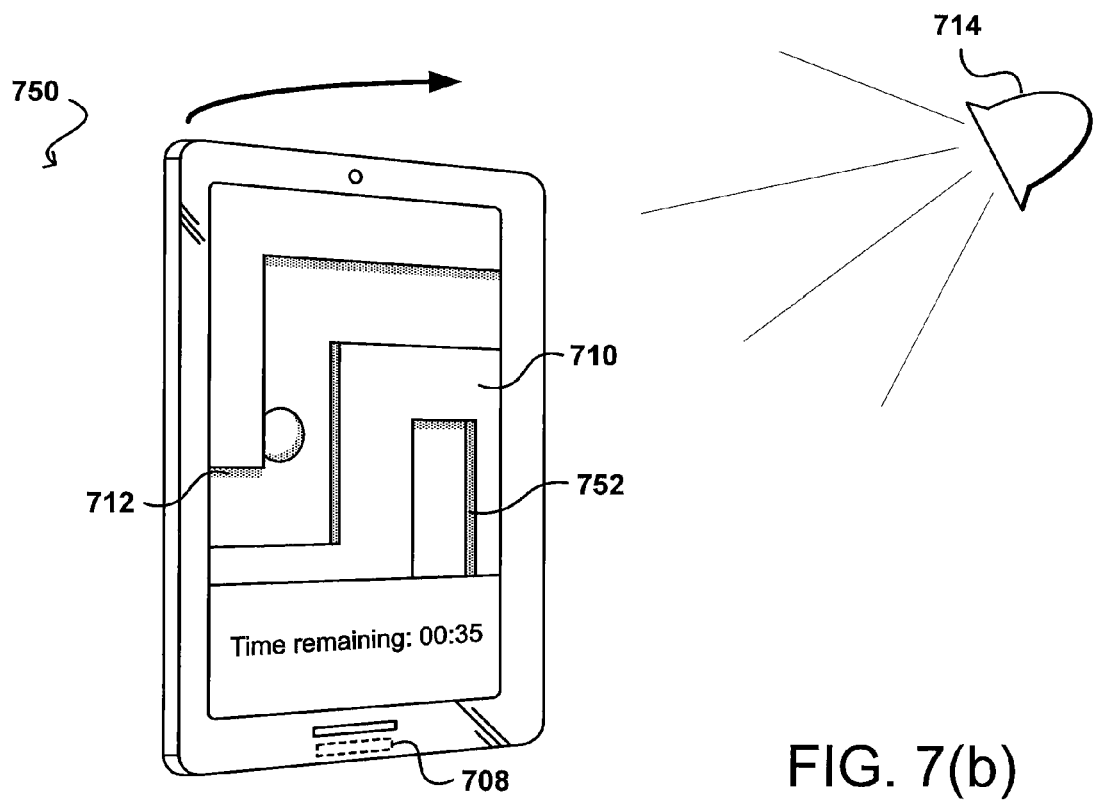

In other embodiments, a device can utilize one or more light determining elements to attempt to determine at least a primary direction of a light source near the device, or to generate an intensity map for lighting around the device. Approaches for determining such information can be found, for example, in co-pending U.S. patent application Ser. No. 13/107,749, filed May 13, 2011, entitled "Intensity Modeling for Rendering Realistic Images," which is hereby incorporated herein by reference. Once a relative position of a light source and/or other relative lighting information is determined, the device can utilize this information to light and/or shade the rendered image information appropriately even upon changes in orientation of the device with respect to the lighting. For example, FIG. 7(*a*) illustrates an example display on a display screen 702 of a device 700, where the display includes information for a maze. The image is a top down view of the maze, and shadowing 712 is rendered for the walls 710 of the maze based upon the detected relative position of a light source 714, as determined via at least one light determining element 704. As discussed above, the device can utilize one or more orientation determining elements 706, 708 to determine a change in orientation of the device. FIG. 7(*b*) illustrates an example situation 750 wherein the device has been rotated with respect to the light source 714. As discussed above, the walls of the display can be adjusted to show side portions 752 consistent with the change in viewing direction if the maze were actually rendered in three dimensions. Using the known relative location of the light source 714 and the change in orientation, the device can also determine the proper direction to the light source in the new orientation, and as such can generate shadows for the "three-dimensional" elements based at least in part upon the lighting direction, as would be consistent for the current user viewing angle. The ability to adjust shadowing with the changes in display in a realistic way can help to enhance the user experience, and can also help the user to better understand the direction and/or texture of, for example, a two-dimensional representation of a three-dimensional element. Various other shading approaches can be used as well as should be apparent in light of the teachings and suggestions contained herein.

Figure 8A:
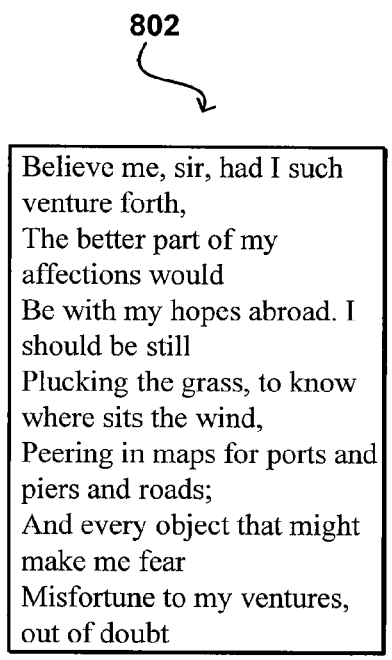
FIGS. 8(a)-8(b) illustrate example displays of book content for different orientations of a device in accordance with various embodiments.
Figure 8B:
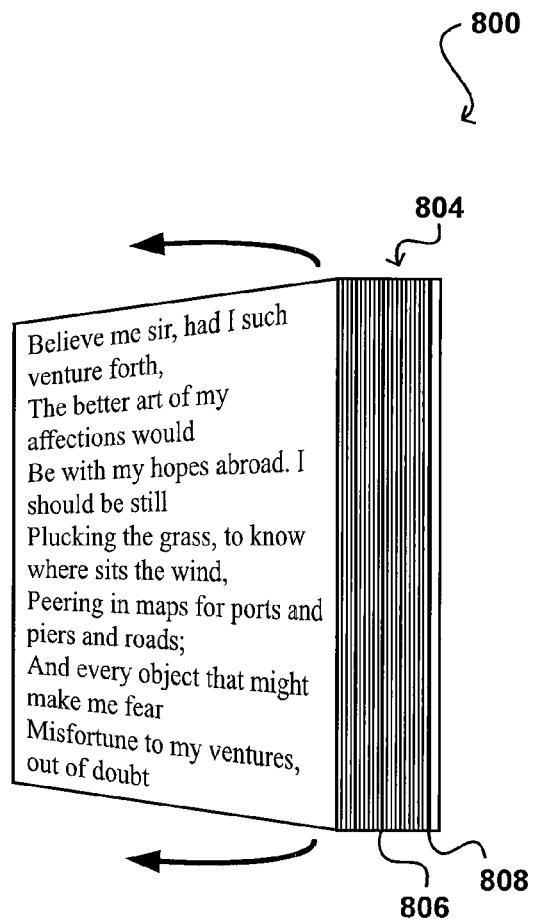

Other types of information can be utilized with orientation-dependent displays as well in accordance with various embodiments. For example, in FIG. 5(b), the display of the side of the drop-off could have included additional information useful to a user, such as the height of the drop-off at one or more locations, a direction to the nearest path down the hill, information about the name of the waterfall, etc. FIGS. 8(a) and 8(b) illustrate different views of an electronic book (e-book) 800, or similar content, that can be displayed on an electronic device using various approaches discussed herein. In FIG. 8(a), the user (not shown) is in a default position (or within a default range of positions) with respect to the device, such as substantially in front of the display element. Accordingly, the user can obtain a conventional view of the text 802 in the e-book at that viewing angle. While reading the e-book, the user might want to obtain certain information, such as how far the user is from the end of the book, or how far it is until the next chapter. Accordingly, a user can change their viewpoint with respect to the device, such as by rotating the device or moving the user's head, to view a "side" of the electronic book on the display. As illustrated in FIG. 8(b), the user can tilt the device to see a view that includes a representation of the edges 804 of the pages of the book between the current page and the end of the book. Such an approach can provide value to the user, and also potentially make the e-book experience more like reading an actual book. Additional information can be added as well. For example, the edge of the book can include not only an indicator 808 of the end (i.e., back cover) of the book, but can also include other indicators 806 to certain sections as well. For example, the side of the e-book can include indicators marking the location of the next chapter and/or subsequent chapters, as well as the location of various notes, bookmarks, highlights, etc. Using such an approach, a user can tilt the device to see how far until the end of the chapter, for example, to determine whether to continue reading until the end of the chapter or end the current viewing session at a different location. By using the indicators, a user can move to an identified section of the e-book, using eye tracking as described in FIGS. 13 and 14.

In some embodiments, the rendered image can also be manipulated (e.g., stretched or otherwise deformed) in order to make the view of an object from the perspective of the user seem as if the display screen is a piece of glass through which the user is looking, rather than a conventional display screen in which things become increasingly compressed as the viewing angle increases. Approaches to deforming images to provide a consistent aspect ratio or view can be found, for example, in co-pending U.S. patent application Ser. No. 13/076,322, filed Mar. 30, 2011, and entitled "Viewer Tracking Image Display," which is hereby incorporated herein by reference.

Figure 9:
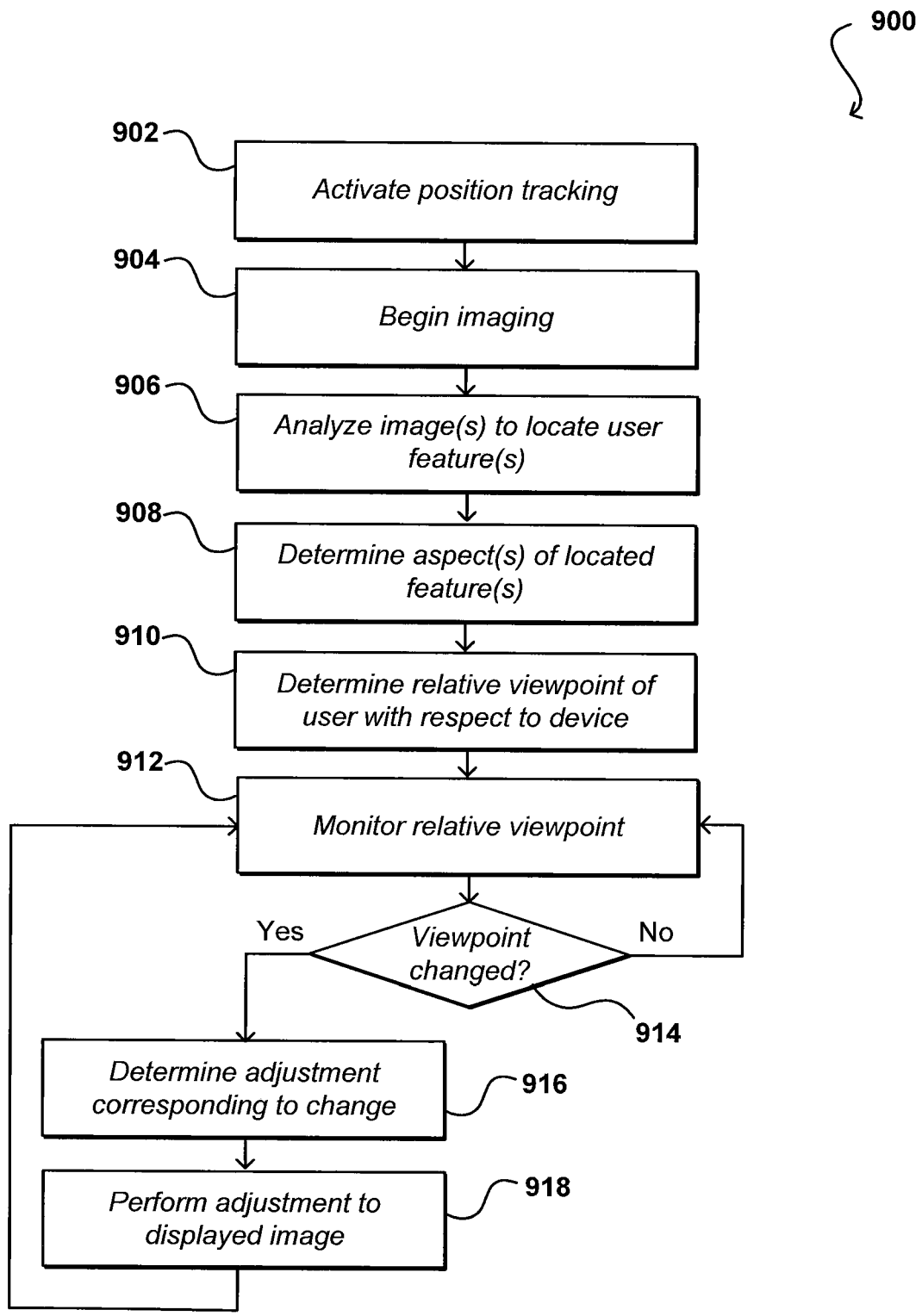
FIG. 9 illustrates an example process for updating a display of information to account for orientation changes in accordance with various embodiments.

FIG. 9 illustrates an example of a first portion 900 of a process for providing a relative viewpoint-based image display that can be used in accordance with various embodiments. It should be understood that, for any process discussed herein, there can be additional, fewer or alternative steps performed in similar or alternative orders, or in parallel, within the scope of the various embodiments unless otherwise stated. In this example, position tracking of a user is activated on the device 902. In some embodiments a user must activate this mode manually, while in other modes the device can activate the mode automatically when a person is detected nearby. Other modes of activation are possible as well, such as upon a user opening a specific application on the device. When the position tracking is active, the device can begin imaging around the device 904, whether in all directions, some directions, a specific range of directions, or a direction substantially toward a determined user. As discussed elsewhere herein, in some embodiments the imaging will involve ambient light image or video capture, while in other embodiments a device can utilize infrared imaging, heat signature detection or any other such approach. The device can analyze the captured image information to attempt to locate features of a user 906, or at least a person nearby, where those features in some embodiments include at least the eyes, nose, or head of a user. In some embodiments, the device will attempt to locate an object that is shaped like a human head and that contains two eye-like features. In other embodiments, facial recognition or any other such algorithm can be used to attempt to determine the presence of a human head, or other portion or feature of a user, in the field of view of at least one of the imaging elements.

Once the user features are located, the device can attempt to determine aspects or information relating to those features 908. In this example, the determined aspects can be used to attempt to determine a relative viewpoint of the user with respect to the device 910, as well as the orientation of those features relative to the device in at least some embodiments, which can be useful in determining information such as the present viewpoint of a user. The determined aspects then can be monitored over time 912, such as by continuing to capture and analyze image information to determine the relative viewpoint of the user and/or orientation of the device. In at least some embodiments, an orientation-determining element such as an accelerometer or electronic gyroscope can be used to assist in tracking the relative location of the user and/or current relative orientation of the device. A change in the viewpoint, such as a change in position or orientation, can be determined 914, and the device can determine whether that change requires an adjustment to the image to be displayed 916. For example, an application might require the device to be rotated a minimum amount before adjusting the displayed image content, such as to account for a normal amount of user jitter or other such movement that may not be intended as input. Similarly, certain embodiments might not utilize continuous rotation, but might change views upon certain degrees of change in relative viewpoint of the user with respect to the device. If the orientation change is sufficient to warrant an adjustment, the device can determine and perform the appropriate adjustment to the image information 918, such as to stretch, compress, pan or rotate at least portions of the image.

Figure 10:
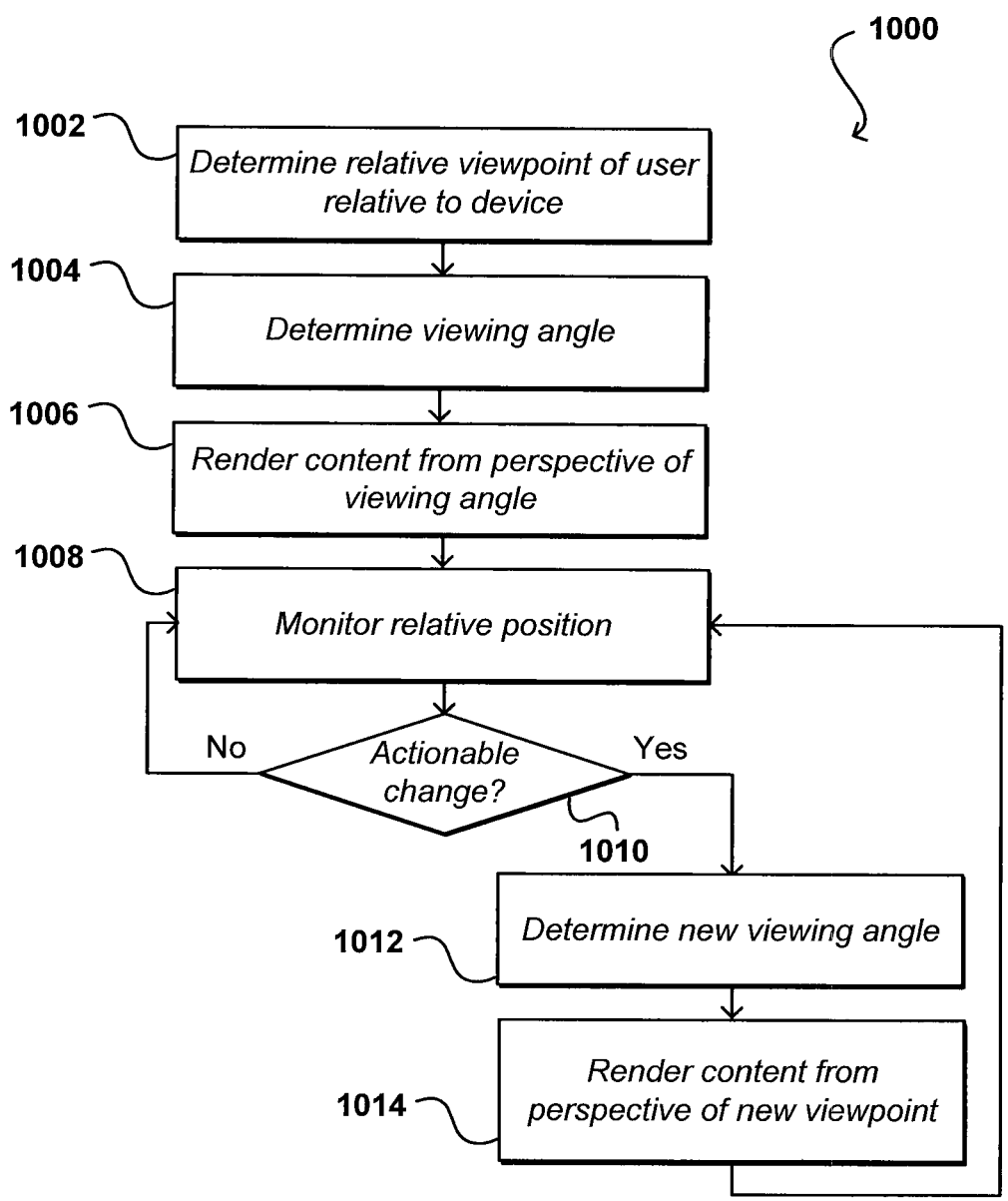
FIG. 10 illustrates an example process for determining relative position that can be used in accordance with various embodiments.

As an example of one such adjustment, FIG. 10 illustrates a second portion 1000 of a process for modifying the image in response to a determined change in viewpoint that can be used in accordance with various embodiments. In this example, aspects of the image and any other information displayed can be based at least in part upon the relative viewpoint of a user, although various other approaches could be used as well, as discussed elsewhere herein. During operation, an electronic device can determine (and monitor over time) the relative viewpoint a user 1002. Based at least in part upon the relative viewpoint, a primary viewing direction or viewing angle of the user can be determined 1004. An application executing on the device (or remote to the device) can utilize mapping, position or other such data to render image content from a perspective associated with the determined viewing angle 1006.

Once the viewpoint of the user is determined, the device can attempt to monitor or detect changes in the viewpoint or relative position 1008, as may result from changes in position or orientation of the user and/or the device. Changes in the relative viewpoint can be analyzed to determine whether the change is actionable 1010, such as where the change meets a minimum movement threshold. In some embodiments, small movements might not result in adjustments in the display, in order to account for jitter or subtle variations due to the user holding a device, for example, that are not intended as input to change the viewpoint. In various embodiments, there also must be a minimum amount of movement in order to justify the re-rendering of the displayed image content. For example, cellular phones and portable media players might not have a significant amount of graphics processing capacity, such that continually attempting to re-render content using three-dimensional maps or other such information can consume a significant amount of resources of the device, slowing down the rendering and potentially other functionality. Further, continually performing complex renderings can significantly drain battery power for at least certain devices. Thus, for at least some devices it can be desirable to at least wait to re-render the image from a different perspective until there is a minimum amount of movement, etc.

If there is no actionable movement, the device can continue to monitor the relative viewpoint of the user. If there is actionable movement detected, the device can attempt to determine the new relative viewpoint, orientation and/or viewing angle 1012, using any of the approaches discussed or suggested herein. Based in part upon the new relative viewpoint, for example, the device can render the image content from a perspective consistent, or at least associated, with that viewpoint 1014. The image information can be manipulated (e.g., rotated, stretched, compressed, translated, etc.) to provide a consistent quasi-three-dimensional view, as discussed elsewhere herein. Additional information can be added as well, such as shadowing from a nearby light source or elements providing information about a portion of the display. In at least some embodiments, an application can attempt to provide consistency in the rendering and shading from any of a number of different viewpoints consistent with a three-dimensional display, even when the element used to display the image information is two-dimensional in nature.

Figure 11:
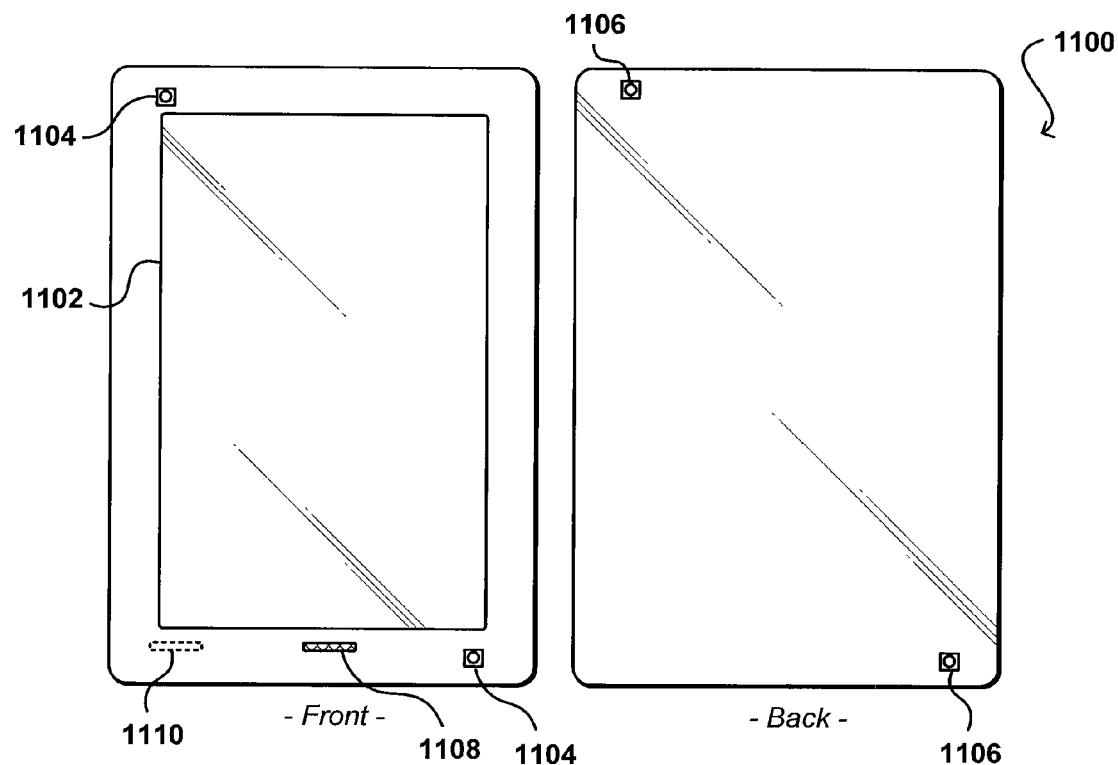
FIG. 11 illustrates an example device that can be used in accordance with various embodiments.

FIG. 11 illustrates front and back views of an example computing device 1100 that can be used in accordance with various embodiments. Although a portable computing device (e.g., a smart phone, an electronic book reader or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes and portable media players, among others.

In this example, the computing device 1100 has a display screen 1102, which under normal operation will display information to a user (or viewer) facing the display screen (e.g., on the same side of the computing device as the display screen). The computing device in this example can include one or more image capture elements, in this example including two image capture elements 1104 on the front of the device and two image capture elements 1106 on the back of the device, although it should be understood that additional or fewer image capture elements could be used, and could also, or alternatively, be placed on the sides, corners or other locations on the device. The image capture elements also can be of similar or different types. Each image capture element may be, for example, a camera, a charge-coupled device (CCD), a motion detection sensor or an infrared sensor, or can utilize other image capturing technology. The computing device can also include at least one microphone or other audio capture element 1108 capable of capturing audio data, and one or more orientation-determining elements 1110, such as an accelerometer, gyroscope, digital compass or inertial sensory, that can assist with movement and/or orientation determinations.

Figure 12:
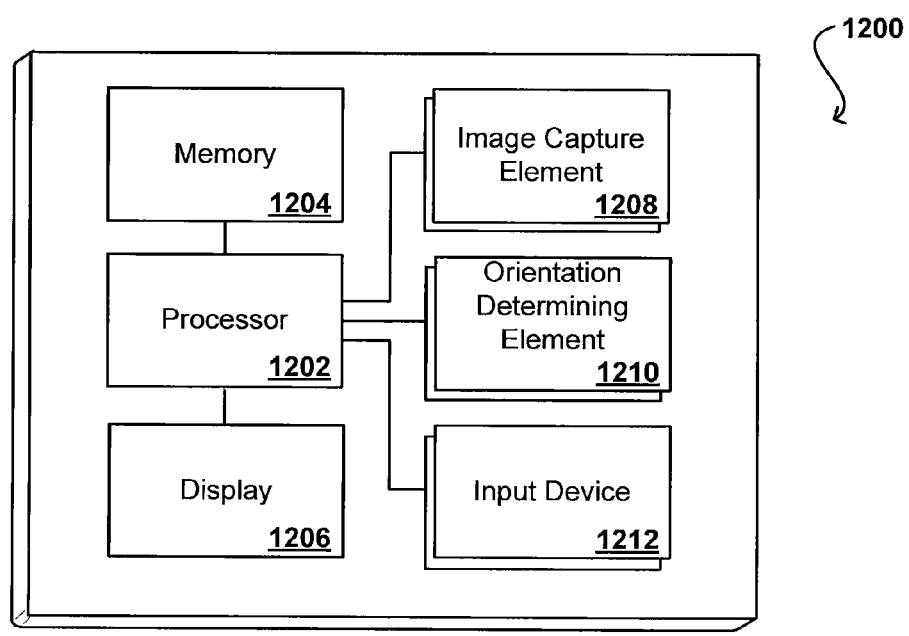
FIG. 12 illustrates example components of a computing device such as that illustrated in FIG. 11.

FIG. 12 illustrates a set of basic components of a computing device 1200 such as the device 1100 described with respect to FIG. 11. In this example, the device includes at least one processor 1202 for executing instructions that can be stored in a memory device or element 1204. As would be apparent to one of ordinary skill in the art, the device can include many types of memory, data storage or computer-readable media, such as a first data storage for program instructions for execution by the processor 1202, the same or separate storage can be used for images or data, a removable memory can be available for sharing information with other devices, and any number of communication approaches can be available for sharing with other devices. The device typically will include at least one type of display element 1206, such as a touch screen, electronic ink (e-ink), organic light emitting diode (OLED) or liquid crystal display (LCD), although devices such as portable media players might convey information via other means, such as through audio speakers. As discussed, the device in many embodiments will include at least two image capture elements 1208, such as at least one image capture element positioned to determine a relative position of a user and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc. As discussed, IR imaging can also be used to locate and track features of a user. Examples of such processes can be found, for example, in co-pending U.S. patent application Ser. No. 12/786,297, filed May 24, 2010, and entitled "Determining Relative Motion as Input," which is hereby incorporated herein by reference.

The device can include at least one orientation determining element 1210, such as an accelerometer, digital compass, electronic gyroscope or inertial sensor, which can assist in determining movement or other changes in orientation of the device. The device can include at least one additional input device 1212 able to receive conventional input from a user. This conventional input can include, for example, a push button, touch pad, touch screen, wheel, joystick, keyboard, mouse, trackball, keypad or any other such device or element whereby a user can input a command to the device. These devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 13A:
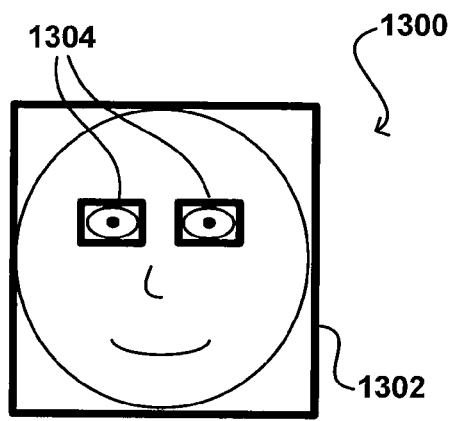
FIGS. 13(a)-13(f) illustrate example approaches to determining head position and/or gaze direction that can be used in accordance with various embodiments.

Various approaches can be utilized for locating one or more desired features of a user's face to determine various aspects useful for determining relative orientation. For example, an image can be analyzed to determine the approximate location and size of a user's head or face. FIG. 13(a) illustrates an example wherein the approximate position and area of a user's head or face 1300 is determined and a virtual "box" 1302 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1304 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Figure 13B:
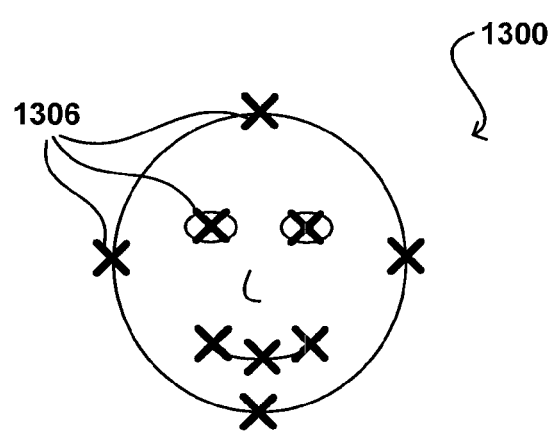

Various other algorithms can be used to determine the location of features on a user's face. For example, FIG. 13(b) illustrates an example wherein various features on a user's face are identified and assigned a point location 1306 in the image. The system thus can detect various aspects of user features and can determine more subtle changes in orientation. Such an approach provides advantages over the general approach of FIG. 13(a) in certain situations, as various other features can be determined, in case the user's eyes cannot be seen due to glasses, hair, etc.

Figure 13C:
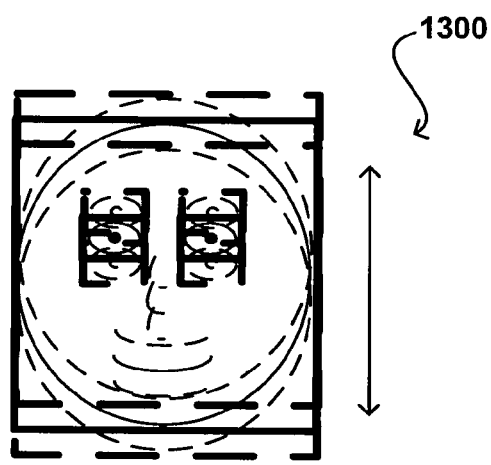
Figure 13D:
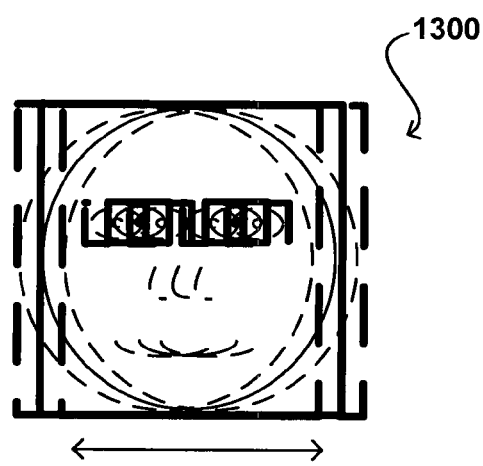
Figure 13E:
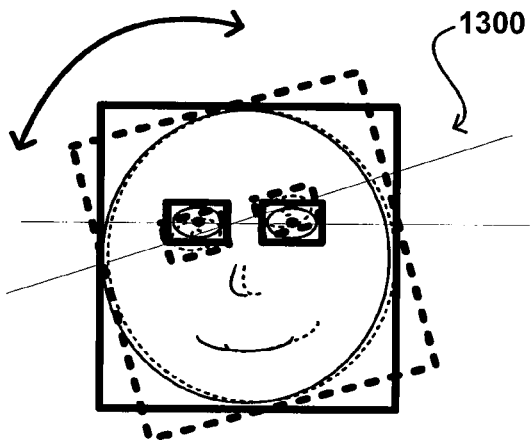
Figure 13F:
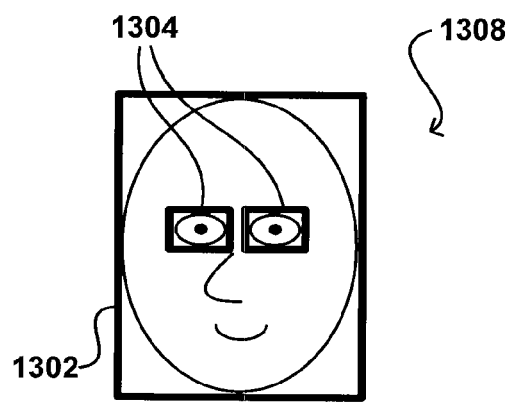

Once the positions of facial features of a user are identified, relative motion between the user and the device can be detected and utilized as input. For example, FIG. 13(c) illustrates an example where the user's head 1300 is moving up and down with respect to the viewable area of the imaging element. As discussed, this could be the result of the user moving his or her head, or the user moving the device up and down, etc. FIG. 13(d) illustrates a similar example wherein the user is moving right to left relative to the device, through movement of the user, the device or both. Each movement can be tracked as a vertical or horizontal movement, respectively, and each can be treated differently as an input to modify a displayed image. As should be understood, such a process also can detect diagonal or other such movements. FIG. 13(e) further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 13(f) illustrates another advantage of using an approach such as that described with respect to FIG. 13(b) to determine the position of various features on a user's face. In this exaggerated example, it can be seen that the features of a second user's head 1308 have a different relative position and separation. Thus, the device also can not only determine positions of features for a user, but can distinguish between different users.

Figure 14A:
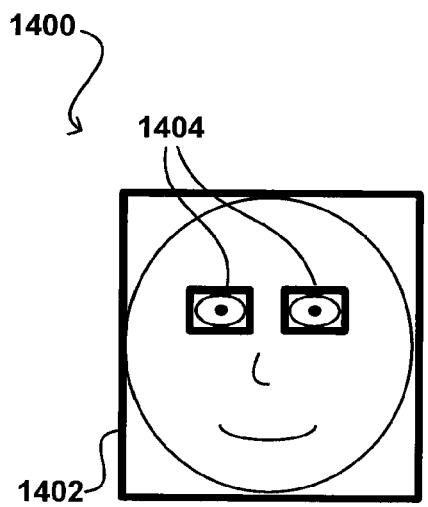
FIGS. 14(a)-14(b) illustrate example approaches to determining changes in the relative distance to a user in accordance with various embodiments.
Figure 14B:
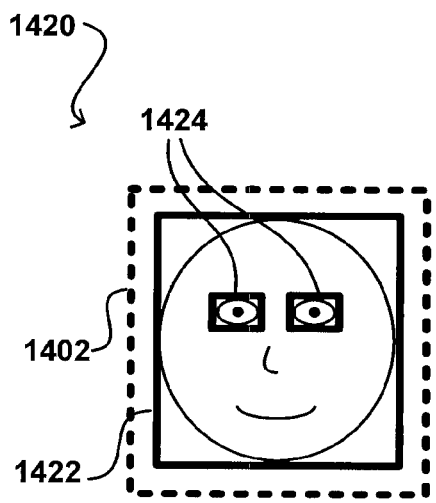

FIGS. 14(a) and 14(b) illustrate an example approach that can be used to determine variations in relative distance between a user and a device that can be used in accordance with various embodiments. As in FIG. 13(a), the approximate position and area of a user's head or face 1400 is determined and a virtual "box" 1402 is placed around the face at an initial distance as an indication of distance using one of a plurality of image analysis algorithms for making such a determination. If the user is known, the size of the user's head might be stored such that an actual distance to the user can be calculated based at least in part upon the size of the box 1402. If the user is not known, the distance can be estimated or determined using other factors, such as stereoscopic imaging. In some embodiments, determinations will be relative with respect to an initial box size when the actual distance cannot be determined.

As the distance between the user and the device changes, the size of the virtual box will change as well. For example, in FIG. 14(b) the distance between the user and the device has increased, such that the user's head 1420 appears smaller in the captured image information. Accordingly, the size of the virtual box 1422 for the adjusted size of the user's head is smaller than the original box 1402 for the initial distance. By monitoring adjustments in the size of the box or another measure of the user's head and/or other such features (e.g., boxes 1424), the device can determine an approximate distance and/or change in distance to the user. As discussed, this information can be used to adjust aspects of the displayed image information such as a level of zoom or amount of detail.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred.

As mentioned, it can be desirable in at least some embodiments to utilize at least two imaging elements (i.e., stereoscopic imaging) to determine the location of the user, as well as to capture image information to be displayed. In almost all situations the position of an imaging element will be offset from the eye of a user, such that some image translation and viewing angle adjustments may need to be made to ensure the consistency of the displayed image. Particularly for applications such as image stabilization from the point of view of the user, it can be important to compensate for differences in viewing angle resulting from the camera being offset from the user's eye.

An imaging element capturing image information in at least one embodiment is a relatively high resolution camera that is able to capture image information over a large angular range. The offset of the user's eyes to the imaging element can create a parallax effect that will cause the window effect to be less than ideal in many situations. In order to compensate for the offset such that the view of the world from the camera matches the view of the world by the user, a three-dimensional model of the surrounding area can be generated that enables the device to rotate the view as necessary to match the viewpoint of the user. Without stereo cameras the device can attempt to minimize the effects of parallax by translating the image or making other manipulations, but there will be some slight differences due to the offset.

Figure 15:
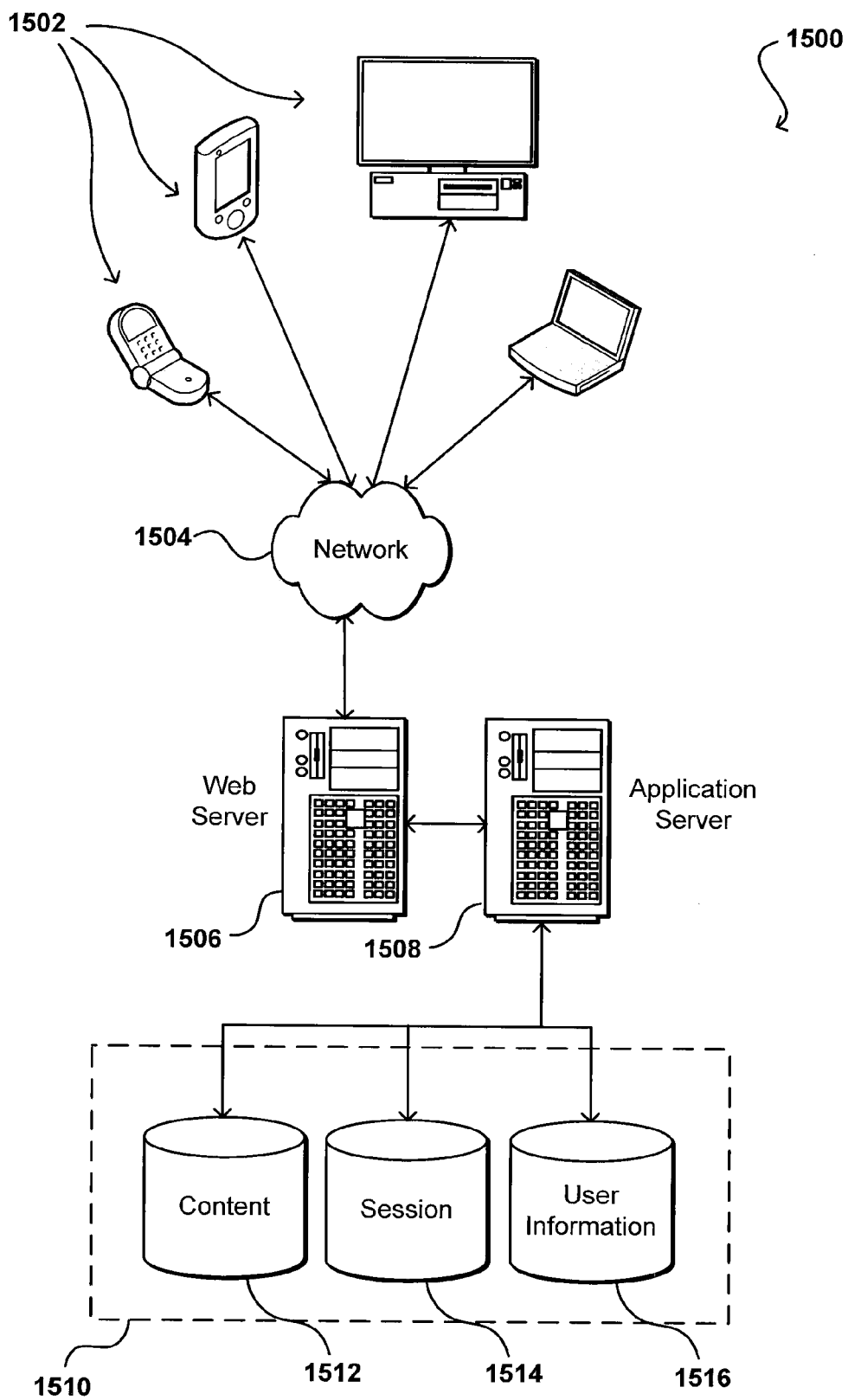
FIG. 15 illustrates an environment in which various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1506 for receiving requests and serving content in response thereto, although for other networks, an alternative device serving a similar purpose could be used, as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1506 in the form of HTML, XML or another appropriate structured language in this example. The handling of all requests and responses, as well as the delivery of content between the client device 1502 and the application server 1508, can be handled by the Web server 1506. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing content (e.g., production data) 1512 and user information 1516, which can be used to serve content for the production side. The data store is also shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response to requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of providing viewpoint-dependent image display, comprising:
    capturing a first image of a user of an electronic device using at least one imaging element of the electronic device;
    determining a first relative viewpoint of the user with respect to the electronic device based at least in part upon the first image;
    obtaining information for generating a graphical three-dimensional representation of a plurality of objects;
    rendering a first graphical representation of the plurality of objects for display on a display element of the electronic device to correspond to the first relative viewpoint of the user, a first object of the plurality of objects being rendered to occlude a second object of the plurality of objects by a first amount;
    detecting, using an orientation determining element of the electronic device, a change in orientation of the electronic device;
    determining, based at least in part on the change in orientation, a second relative viewpoint of the user with respect to the electronic device, wherein the second relative viewpoint is different from the first relative viewpoint; and
    rendering, based at least in part on the change in orientation, a second graphical representation of the first object and the second object to correspond to the second relative viewpoint of the user, wherein rendering the second graphical representation includes:
        rendering, by utilizing three-dimensional data of the first object and three-dimensional data of the second object, the first object to occlude the second object by a second amount, the first amount being different than the second amount,
        determining a shadow to be cast on the second object based at least in part on the second amount of occlusion and an intersection of virtual light from a virtual light source with the first object, and
        rendering the shadow on the second object.

2. The method of claim 1, wherein one of the first amount or the second amount is zero.

3. The method of claim 1, wherein the at least one first image of the user is captured using at least two imaging elements to determine a three-dimensional relative position of the user with respect to the electronic device.

4. The method of claim 1, wherein determining the second relative viewpoint includes at least one of:
    capturing at least one second image of the user, and
    detecting a change in orientation using at least one orientation determining element of the electronic device.

5. The method of claim 1, wherein rendering the second graphical representation of the plurality of objects for display includes utilizing a three-dimensional model to determine the first amount and second amount of occlusion.

6. The method of claim 1, wherein rendering the second graphical representation of the plurality of objects for display includes shifting a displayed position of at least one object based upon a viewpoint change between the first relative viewpoint and the second relative viewpoint, the shifting providing a display of image content previously occluded by the first object of the plurality of objects in the at least one first image.

7. The method of claim 1, wherein rendering the second graphical representation of the plurality of objects for display includes updating at least one of a rendering or a shading of the graphical three-dimensional representation of the plurality of objects based at least in part upon at least one of a change in a relative viewpoint, a change in an orientation, or a change in a relative location of at least one light source.

8. A method of providing a graphical representation of an image of a plurality of objects for display on an electronic device, comprising:
   determining a first relative viewpoint of a user with respect to the electronic device based at least in part on image data of the user;
   rendering a first graphical representation of the image to be displayed on a display element of the electronic device, the first graphical representation including a first object and a second object rendered based at least in part on the first relative viewpoint, the first object at least partially occluding the second object by a first amount;
   detecting, using an orientation determining element of the electronic device, a change in orientation of the electronic device;
   detecting, based at least in part on the change in orientation, a change from the first relative viewpoint to a second relative viewpoint; and
   rendering, based at least in part on the second relative viewpoint, a second graphical representation of the image to be displayed on the display element, the second graphical representation of the image being rendered to correspond to the change from the first relative viewpoint to the second relative viewpoint, wherein rendering includes:
      rendering, by utilizing three-dimensional data of the first object and three-dimensional data of the second object, the first object to occlude the second object by a second amount, the first amount being different than the second amount,
      determining a shadow to be cast on the second object based at least in part on the second amount of occlusion and an intersection of virtual light from a virtual light source with the first object, and
      rendering the shadow on the second object.

9. The method of claim 8, wherein the image data of the user is obtained at least in part from an imaging element of the electronic device.

10. The method of claim 8, wherein the change from the first relative viewpoint to the second relative viewpoint is based at least in part on at least one of a movement of the user or a movement of the electronic device.

11. The method of claim 8, wherein at least one of the first relative viewpoint and the second relative viewpoint is determined based at least in part upon data obtained using at least one image capture element of the electronic device.

12. The method of claim 8, wherein at least one of the first graphical representation and the second graphical representation includes at least one of map data, topographic data, or three-dimensional position data.

13. The method of claim 8, wherein the second graphical representation includes a portion of the first object occluded by the second object in the first graphical representation.

14. The method of claim 8, wherein determining the first relative viewpoint between the user and the electronic device includes using at least two imaging elements to determine a three-dimensional relative position of the user with respect to the electronic device.

15. The method of claim 8, wherein determining at least one of the first relative viewpoint and the change from the first relative viewpoint to the second relative viewpoint includes capturing image data of the user with at least one of thermal imaging, infrared radiation detection or motion detection.

16. The method of claim 8, wherein rendering the first graphical representation of the image includes at least one of lighting or shading based at least in part upon a determined relative position of at least one light source.

17. The method of claim 16, wherein light source is at least one of a virtual light source or a physical light source near the electronic device.

18. The method of claim 8, wherein a change in a position of the second object in the second graphical representation of the image is based at least in part upon at least one of a position of the second object, a current level of zoom, or a relative user distance.

19. The method of claim 8, further comprising:
   rendering at least one animation over at least a portion of the rendered second graphical representation of the image.

20. The method of claim 8, wherein at least one object in the first or second graphical representation of the image has associated data in three-dimensions, the at least one object rotatable to correspond at least in part to the change from the first relative viewpoint to the second relative viewpoint.

21. The method of claim 8, wherein the second graphical representation of the image contains a rotated representation of the second object providing additional information.

22. A computing device, comprising:
   a processor;
   a display element;
   at least one image capture element; and
   a memory device including instructions operable to be executed by the processor to perform a set of actions, enabling the computing device to:
      determine, based on an image of a user obtained from the at least one image capture element, a first relative viewpoint of at least one of the user or the computing device;
      render a first graphical representation of the image to be displayed on the display element, the first graphical representation including a first object and a second object rendered from a first perspective associated with the first relative viewpoint, the first object at least partially occluding the second object by a first amount;
      detect, using an orientation determining element of the computing device, a change in orientation of the computing device; and
      render, based at least in part on the change in orientation, a second graphical representation of the image to be displayed on the display element, the second graphical representation of the image being rendered to correspond to the change from the first relative viewpoint to a second relative viewpoint, the second graphical representation rendered from a second perspective associated with the second relative viewpoint, the rendering including:
         rendering, by utilizing three-dimensional data of a first object and three-dimensional data of a second object, the first object to occlude the second object by a second amount, the first amount being different than the second amount, determining a shadow to be cast on the second object based at least in part on the second amount of occlusion and an intersection of virtual light from a virtual light source with the first object, and rendering the shadow on the second object.

23. The computing device of claim 22, wherein the change between the first relative viewpoint and the second relative viewpoint is determined by detecting at least one of a movement of the user a movement of the computing device.

24. The computing device of claim 22, further comprising:

at least one orientation determining element operable to determine at least one of a change in orientation or a position of the computing device.

25. The computing device of claim 22, further comprising:

at least one light sensing element for use in at least one of lighting or shading of a graphical representation to be displayed.

* * * * *